(12) United States Patent
Shin et al.

(10) Patent No.: US 12,397,750 B2
(45) Date of Patent: Aug. 26, 2025

(54) METHOD FOR KEEPING CLEAR A VIEWING REGION OF AN OPTICAL MONITORING DEVICE

(71) Applicant: EchoVista Ultrasound Surface Cleaning LTD, Romsey (GB)

(72) Inventors: Mincheol Shin, Seligenstadt (DE); Oliver Simon Matthews, Seligenstadt (DE); Steffen Walter, Seligenstadt (DE)

(73) Assignee: EchoVista Ultrasound Surface Cleaning LTD, Romsey (GB)

(*) Notice: Subject to any disclaimer, the term of this patent is extended or adjusted under 35 U.S.C. 154(b) by 0 days.

(21) Appl. No.: 18/026,635

(22) PCT Filed: Sep. 17, 2021

(86) PCT No.: PCT/EP2021/075696
§ 371 (c)(1),
(2) Date: Mar. 16, 2023

(87) PCT Pub. No.: WO2022/058545
PCT Pub. Date: Mar. 24, 2022

(65) Prior Publication Data
US 2024/0024929 A1 Jan. 25, 2024

(30) Foreign Application Priority Data
Sep. 17, 2020 (DE) ..................... 10 2020 124 322.7

(51) Int. Cl.
*B08B 3/12* (2006.01)
*B08B 7/02* (2006.01)
(Continued)

(52) U.S. Cl.
CPC .............. *B60S 1/0848* (2013.01); *B08B 3/12* (2013.01); *B08B 7/028* (2013.01); *B08B 7/04* (2013.01);
(Continued)

(58) Field of Classification Search
CPC ... B08B 3/12; B08B 3/00–14; G02B 27/0006; G01N 2021/154; B60S 1/56;
(Continued)

(56) References Cited

U.S. PATENT DOCUMENTS 4,187,868 A 2/1980 Rudolphi
7,410,814 B1 * 8/2008 Loxley .............. H01L 21/67057
438/746
(Continued)

FOREIGN PATENT DOCUMENTS

CN 101885323 11/2010
DE 2809748 9/1978
(Continued)

OTHER PUBLICATIONS

International Preliminary Report on Patentability Dated Mar. 21, 2023 From the International Bureau of WIPO Re. Application No. PCT/EP2021/075696. (10 Pages).
(Continued)

*Primary Examiner* — Kaj K Olsen
*Assistant Examiner* — Richard Z. Zhang

(57) ABSTRACT

A method of keeping a viewing area through a transparent element of an optical monitoring device clear, comprising:
forming a closed film of a liquid on the transparent element, and
coupling ultrasonic waves into the transparent element. The loosening of contaminations and/or adhesions to the transparent element is promoted by the ultrasonic waves coupled into the liquid film and/or the transparent element.

17 Claims, 2 Drawing Sheets

(51) Int. Cl.
  *B08B 7/04* (2006.01)
  *B60S 1/02* (2006.01)
  *B60S 1/08* (2006.01)
  *B60S 1/56* (2006.01)
  *G01N 21/15* (2006.01)
  *G02B 27/00* (2006.01)

(52) U.S. Cl.
  CPC . *B60S 1/02* (2013.01); *B60S 1/56* (2013.01); *G02B 27/0006* (2013.01); *G01N 2021/154* (2013.01)

(58) Field of Classification Search
  CPC ..... B60S 1/0848; B60S 1/02; B60S 1/00–685
  See application file for complete search history.

(56) References Cited

U.S. PATENT DOCUMENTS

| | | | |
|---|---|---|---|
| 2006/0124152 A1* | 6/2006 | Li | C12Q 1/6813 134/25.4 |
| 2010/0224214 A1* | 9/2010 | Kaneko | B08B 3/048 134/1 |
| 2011/0073142 A1 | 3/2011 | Hattori | |
| 2012/0012134 A1* | 1/2012 | Tsukamoto | H01L 21/02057 134/28 |
| 2012/0117745 A1 | 5/2012 | Hattori | |
| 2012/0227761 A1* | 9/2012 | Leighton | B08B 3/12 134/1 |
| 2012/0243093 A1 | 9/2012 | Tonar et al. | |
| 2014/0299748 A1 | 10/2014 | Koops et al. | |
| 2017/0225660 A1* | 8/2017 | Trebouet | G01S 17/93 |
| 2019/0315288 A1* | 10/2019 | Koharazawa | B60K 35/22 |
| 2020/0384958 A1* | 12/2020 | Najorka | B08B 3/12 |
| 2022/0144219 A1* | 5/2022 | D'Onofrio | B60S 1/52 |

FOREIGN PATENT DOCUMENTS

| | | |
|---|---|---|
| DE | 4217559 | 12/1993 |
| DE | 10148401 | 4/2003 |
| DE | 102010041475 | 6/2011 |
| DE | 102015118670 | 5/2017 |
| DE | 102016108978 | 11/2017 |
| DE | 102016108978 A1 * | 11/2017 |
| DE | 102019000306 | 6/2019 |
| DE | 102018220783 | 6/2020 |
| DE | 102019123478 | 3/2021 |
| DE | 102019130604 | 5/2021 |
| EP | 3618415 | 3/2020 |
| JP | 6645984 B2 * | 2/2020 |
| WO | WO 2019/101388 | 5/2019 |

OTHER PUBLICATIONS

Internationaler Recherchenbericht und Schriftlicher Bescheid [International Search Report and the Written Opinion] Dated Dec. 6, 2021 From the International Searching Authority Re. Application No. PCT/EP2021/075696 and Its Translation of Search Report Into English. (16 Pages).

Prüfungsbescheid [Substantive Examination Report] Dated Aug. 7, 2021 From the Deutwches Patent—und Markenamt [German Patent and Trademark Office] Rc. Application No. 102020124322.7. (6 Pages).

* cited by examiner

METHOD FOR KEEPING CLEAR A VIEWING REGION OF AN OPTICAL MONITORING DEVICE

RELATED APPLICATIONS

This application is a National Phase of PCT Patent Application No. PCT/EP2021/075696 having International filing date of Sep. 17, 2021, which claims the benefit of priority of Germany Patent Application No. 10 2020 124 322.7 filed on Sep. 17, 2020. The contents of the above applications are all incorporated by reference as if fully set forth herein in their entirety.

FIELD AND BACKGROUND OF THE INVENTION

Optical monitoring devices are for example cameras, radar devices, laser scanners, infrared cameras. Since optical monitoring devices receive and, if necessary, also emit electromagnetic waves in the visible and invisible wavelength range, it is important that a viewing area of such an optical monitoring device is largely unobstructed in order to obtain the highest possible light yield and as few scattering effects as possible.

Optical monitoring devices are therefore usually equipped with protective screens that are optically transparent in the relevant wavelength range and can be cleaned in various ways. This can be done by mechanical means manually or automatically—for example by means of a windshield wiper. Since the field of view is also impaired at least temporarily by the mechanical means, an alternative option is to clean optical monitoring devices by means of an ultrasonic device.

EP 3 618 415 A1, for example, shows an optical monitoring device with a cleaning device by means of which a dome-shaped cover plate is excited by ultrasound and a cleaning liquid is thereby moved from an edge region to a central region of the cover plate. On the paths of movement of the liquid, any adhesions on the cover glass are picked up by the liquid and transported with the liquid. The cover glass is cleaned by evaporation of the cleaning liquid at a point where there is a maximum energy of an ultrasonic field.

Due to the fact that the cleaning liquid is evaporated on the cover plate, there is a possibility that solid residues remain on the cover plate despite complete evaporation of the liquid.

These may be for example solid residues on the cover glass or components of the cleaning liquid that are separated by the evaporation process. The solid residues are present at the point where the cleaning liquid is evaporated. This point may be in the viewing area and, at worst, in the center of the viewing area of the optical monitoring device. In particular, in environments containing salt (road salt, sea spray), the deposition of salts on the cover glass is possible.

The residues described above shorten the operating cycles of such an ultrasonic cleaning process. Likewise, the cleaning liquid itself can impair the visibility through the cover glass if the cleaning liquid is moved to the energy maximum of an ultrasonic field and accumulates there.

These disadvantages described above also arise in other prior art applications. DE 28 09 748 A1 describes a method according to which a cleaning liquid is sprayed onto a surface to be cleaned and the sprayed liquid is evaporated again to clean the surface. This evaporation can also take place, for example, by using mechanical waves in the frequency range from 20 to 50 kHz. Here, too, there is the problem of residues described above due to the evaporation and the comparatively low application of cleaning fluid. Similarly, US 2012/0 243 093 A1 deals with the application of a fluid by, for example, a windshield wiper water system of a motor vehicle and subsequent evaporation of the fluid.

DE 42 17 559 A1 likewise describes a moistening of the surface to be cleaned by means of a fogging, which actually takes place intermittently. DE 10 2010 041 475 A1 describes a vibrating mechanism that vibrates a cover glass so that a washing fluid sprayed onto a cover glass is removed from the cover glass.

DE 10 2019 123 478 A1, DE 10 2019 130 604 A1 and DE 10 2019 000 306 A1 describe motor vehicle headlights whose surface can be excited by ultrasonic waves. The headlights are sprayed (fogged) with liquid via an ejector of a dispensing device. Similarly, US 2012/0 117 745 A1 describes the wetting of a surface excited to vibration by means of ultrasound by means of a spraying device. US 2014/0 299 748 A1 again shows a combination of the application of a fluid with the coupling of ultrasonic waves, whereby the fluid exits at discrete outlets of a feed device and partially and intermittently moistens the surface to be cleaned.

CN 1 01 885 323 A describes a method for operating a headlight cleaning system using moisture present on the headlight.

SUMMARY OF THE INVENTION

The object of the invention is to provide a method with the aid of which the clearance of a viewing area of an optical monitoring device is further improved and, in particular, solid deposits can be reliably removed.

The method according to claim 1 is provided for this purpose. Embodiments result according to claims 2 to 14.

According to the method for keeping a viewing area clear through a transparent element of an optical monitoring device, the following method steps are provided: Forming a closed film of a liquid on the transparent element; coupling ultrasonic waves into the transparent element, wherein loosening of contaminations and/or adhesions to the transparent element is promoted by the ultrasonic waves coupled into the liquid film and/or the transparent element.

It has been found that the energy required for the ultrasonic waves to detach contaminations is much lower when a liquid is present on the transparent element. By forming a closed liquid film on the transparent element to be cleaned, which may for example be an outer lens or a protective pane of an optical monitoring device, an advantage results in largely constant optical properties for viewing through the transparent element. In particular, the refraction of light waves through the closed film is largely the same. The frequency can be adjusted according to the type of stain to be removed, and the waveform for ultrasonic excitation can also be selected depending on the stain to be removed. Contamination of the transparent element can be organic or inorganic contaminations. For example, insect residues, mineral deposits, oil films, growths or metallic residues may be mentioned in this context.

According to an embodiment of the invention, the closed liquid film may be present on the entire surface of the transparent element or on a partial area of the transparent element. A closed liquid film is understood to be a continuous wetting of the transparent element by the liquid, at least in certain areas. Thus, a continuous liquid layer is formed on the transparent element at least in some areas. The ultrasonic waves can be transmitted at least partially through the interfacial contact from the transparent element into the liquid film. By at least partially coupling the ultrasonic waves into the liquid, it may be provided that the liquid or the liquid film is moved by the ultrasonic waves. The ultrasonic waves coupled into the transparent element and optionally also into the liquid film excite the transparent element and any residue or contamination thereon to vibrate. The liquid can enclose contaminations on the transparent element and thereby guide ultrasonic waves coupled into the liquid to the contamination or, through its own vibration, excite the contaminations to vibrate or reduce adhesion to the transparent element.

According to an embodiment, it is conceivable to supply the liquid via an internal reservoir of the optical monitoring device or via an external reservoir. Alternatively, it is conceivable that the liquid is obtained from precipitation, such as rain, dew or snow.

With a suitable energy input, it can also result that the liquid is at least partially vaporized by the ultrasonic waves, whereby in a further embodiment cavitation can occur in the liquid. This further increases the effect on the contaminations or adhesions on the transparent element, so that even strongly or firmly adhering contaminations can be detached or at least partially detached from the transparent element.

According to a more detailed embodiment of the method, it is provided that dissolved contaminations are transported out of the viewing area by the liquid. Thus, the liquid is advantageously used in addition to the ultrasonic waves to remove the contaminations and/or adhesions from the transparent element. In this way, the transport out of the viewing area of the optical monitoring device is not exclusively given by the ultrasonic waves after the contaminations and/or adhesions have been detached, but can be supported or completely taken over by a preferably steady flow of the liquid. Thus, the energy from the ultrasonic waves is advantageously required for the detachment of the contaminants and/or adhesions and only in a secondary function for their removal after detachment. Thus, energy requirements for the ultrasonic waves can be metered in a controlled manner and reduced overall. For example, it may be contemplated that the ultrasonic waves are intermittently coupled into the transparent element and/or the energy input via the ultrasonic waves is intermittently increased for the detachment or partial detachment of contaminations and/or adhesions.

In an optional further embodiment of the method, it is provided that the ultrasonic waves propagate essentially in an outer layer of the transparent element. Alternatively or additionally, embodiments may provide that the ultrasonic waves are formed as surface waves. In this way, the advantage is that the ultrasonic waves propagate in multilayer transparent elements, such as laminated glass panes, only in the layer on which contamination and/or adhesion may be present. This prevents ultrasonic energy from being emitted into the interior of a multilayer transparent element that is not to be cleaned, for example during a layer change due to reflection or refraction.

According to one embodiment of the method, the ultrasonic waves are coupled into the transparent element by at least one ultrasonic transducer. The ultrasonic transducer can be arranged on the side of the transparent element to be cleaned or at the rear thereof. For a multilayer transparent element, the ultrasonic transducer may be arranged on the layer to be cleaned. This may include, for a multilayer element, that the transducer is also arranged between the layer to be cleaned and another layer. According to a further development of the method, it is provided that at least one standing wave is formed between at least two ultrasonic transducers. Through the ultrasonic transducers, which are preferably arranged on the side of the transparent element on which the ultrasonic wave is preferably to propagate as a surface wave, the ultrasonic waves are coupled directly into the transparent element in an advantageous manner. In this way, losses due to impedance contrasts of interposed layers and/or elements are prevented. For a single-layer transparent element, however, it is also possible that the ultrasonic transducers are arranged to the rear of the side on which the ultrasonic wave is to propagate as a surface wave. For a multilayer transparent element, it is thus possible to have the ultrasonic transducers arranged between two layers of the transparent element and to couple the ultrasonic wave preferably directly into the layer where the ultrasonic wave is to propagate as a surface wave. By forming a standing wave, a local energy maximum is generated where the liquid and/or the transparent element has a maximum amplitude. In the area where the energy maximum is located, the mechanical effect on the contaminations and/or adhesions and on the liquid is highest, so that the effects described above preferentially occur here.

The ultrasonic transducers can be preferably designed in such a way that they have one or more resonant frequencies. For this purpose, the ultrasonic transducers may have an electrode configuration that allows for one or more resonant frequencies. In this way, the ultrasonic transducers can be operated efficiently in several frequency ranges. Thereby, the advantage arises that different impurities and/or adhesions can be detached.

According to a further embodiment of the method, the liquid may be supplied to the transparent element from an edge region. Supplying the liquid from an edge region to the transparent element has the advantage that the liquid can spread uniformly over the transparent element. A component of the liquid may be provided to be water. According to an optional further embodiment, it may be provided that a cleaning agent is a component of the liquid. Water is advantageously suitable as a component and in particular as a main component of the liquid, since water is readily available and does not have any special requirements for storage, conduction and use. It is advantageous to provide a cleaning agent as a further component of the liquid, since cleaning agents can in particular remove contaminations and/or adhesions from the transparent element by chemical means, so that there is a lower need for energy input via ultrasonic waves. Furthermore, with regard to ultrasonic cleaning, an advantage may be that the surface tension of water can be reduced by a cleaning agent. In this way, the bonding between the contaminations and/or adhesions and the water-based liquid is improved.

It results from a further embodiment of the method that a cleaning agent and/or a disinfectant is intermittently or permanently added to the liquid. Furthermore, it may be provided that a gas is intermittently added to the liquid during feeding. In this case, the advantages described above arise for the cleaning agent, which also apply equally to a disinfectant. The intermittent admixture or addition of cleaning agent and/or disinfectant advantageously represents consumption of these additives as required. In this way, the maintenance intervals for replenishing cleaning and/or disinfecting agents can be extended. The intermittent addition of a gas, which can be compressed air, for example, allows adhesions that cannot be removed by the liquid and/or the ultrasonic waves to be mobilized.

The method is optionally embodied in that the liquid flows from a first side of the transparent member to a second side of the transparent member and forms a flowing top layer on the transparent element. According to a further embodiment, it may be provided that the flowing top layer has a constant thickness or film thickness. According to a specific embodiment, it may additionally be provided that the flow of the flowing top layer is laminar and/or continuous. According to a further embodiment, it results that the flow of the fluid is at least partially caused by a gravitational component. The advantage of providing a flow for the liquid is that contaminations and/or adhesions detached by ultrasonic waves or by the liquid itself do not have to be transported out of the viewing area by the ultrasonic waves. The flow of the liquid takes over the removal in an advantageous manner.

According to one embodiment of the method, it is provided that the liquid is supplied at the first side of the transparent element, wherein, in a further embodiment, it may be provided that the supply is effected through one or more outlets at the first side. The outlets may be formed as openings in an edge region of a recess in which the transparent element is inserted. Similarly, a single opening that fans out in the direction of the transparent window, in particular in a trapezoidal manner, may be provided. In this way, uniform wetting of the surface of the transparent element is achieved and the cleaning result is improved by combined ultrasonic coupling. According to one embodiment, it may be provided that the liquid is discharged at the second side of the transparent element, wherein the discharge may, in a further embodiment, takes place through one or more inlets at the second side. In a closer embodiment of the method, it is provided that the liquid is supplied in a circuit to the supply line. In a further embodiment, a treatment of the liquid may be carried out in the circuit between the inlet and the outlet. In this way, the liquid and, in particular, optionally added cleaning agents and/or disinfectants can be reused, thus saving process resources and allowing maintenance intervals to be designed to be correspondingly longer.

In accordance with a further embodiment of the method, it is provided that a control unit regulates the supply of the liquid and/or generates a control signal for generating the ultrasonic waves. In accordance with another embodiment, it is provided that the control unit regulates the addition of cleaning agent and/or disinfectant to the liquid and/or controls the intermittent gas phase. Accordingly, in an opportune further embodiment, it may be provided that the flow of the liquid is spontaneously increased for a short time by the control unit. This all contributes to a more efficient use of the liquid and/or a more efficient use of energy for the ultrasonic excitation. By providing a gas phase in the cleaning liquid, which can be provided for example by added compressed air, contaminants that cannot be removed by the liquid and/or the ultrasonic waves can be mobilized. The same applies to a spontaneous and briefly increased flow of the liquid.

According to another embodiment of the method, it is provided that the transparent element is temporarily wetted by the closed film of the liquid. By temporarily but in this case preferably completely wetting the transparent element, the consumption or use of the liquid can be further optimized. Thus, in a preferred embodiment, the transparent element is wetted with a closed film of the liquid only when cleaning of the transparent element is indicated. Accordingly, according to a further embodiment of the method, a device for detecting contamination on the transparent element is provided and, when contamination is detected, the transparent element is wetted with the closed film of liquid.

BRIEF DESCRIPTION OF THE SEVERAL VIEWS OF THE DRAWINGS

In the following, the invention is explained in more detail with reference to the embodiments shown in the figures. They show.

DESCRIPTION OF SPECIFIC EMBODIMENTS OF THE INVENTION

Figure 1:
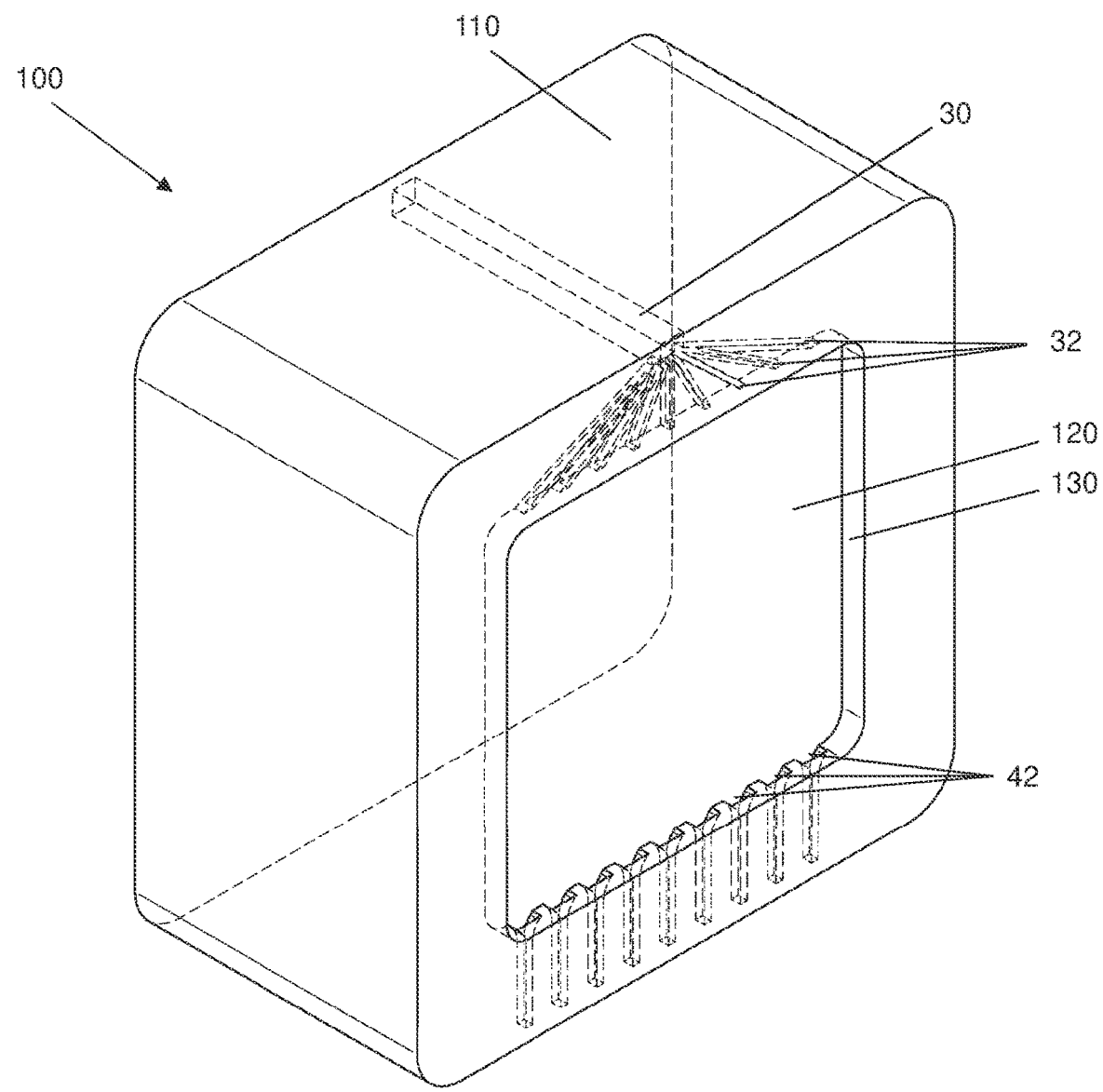
FIG. 1: a schematic representation of an optical monitoring device on which the method is carried out.

FIG. 1 shows an optical monitoring device 100 on which the method can be performed. An optical means such as a camera, not shown here for clarity, is deployed within an enclosure 110. The enclosure 110 has viewing windows, not shown here, as a transparent element 10. The transparent element 10 is arranged at an edge region 130 of the recess 120. In this edge region 130, the liquid is supplied via a supply line 30 and is directed onto the transparent element 10 through outlets 32 in this edge region 130. The liquid forms a closed film 50 on the transparent element 10. The closed film 50 of liquid flows under the force of gravity from outlets 32 arranged on the first side 14 of the transparent element to inlets 42 arranged on a second side 16 of the transparent element 10, opposite the first side 14, in the edge region 130. Here, the liquid forms a flowing covering layer having a constant thickness. The inlets 42 open into a discharge conduit 40, which is not shown. The inlet conduit 30 and the discharge conduit 40 may be connected to each other in a circuit, and the fluid may be treated in said circuit.

Figure 2:
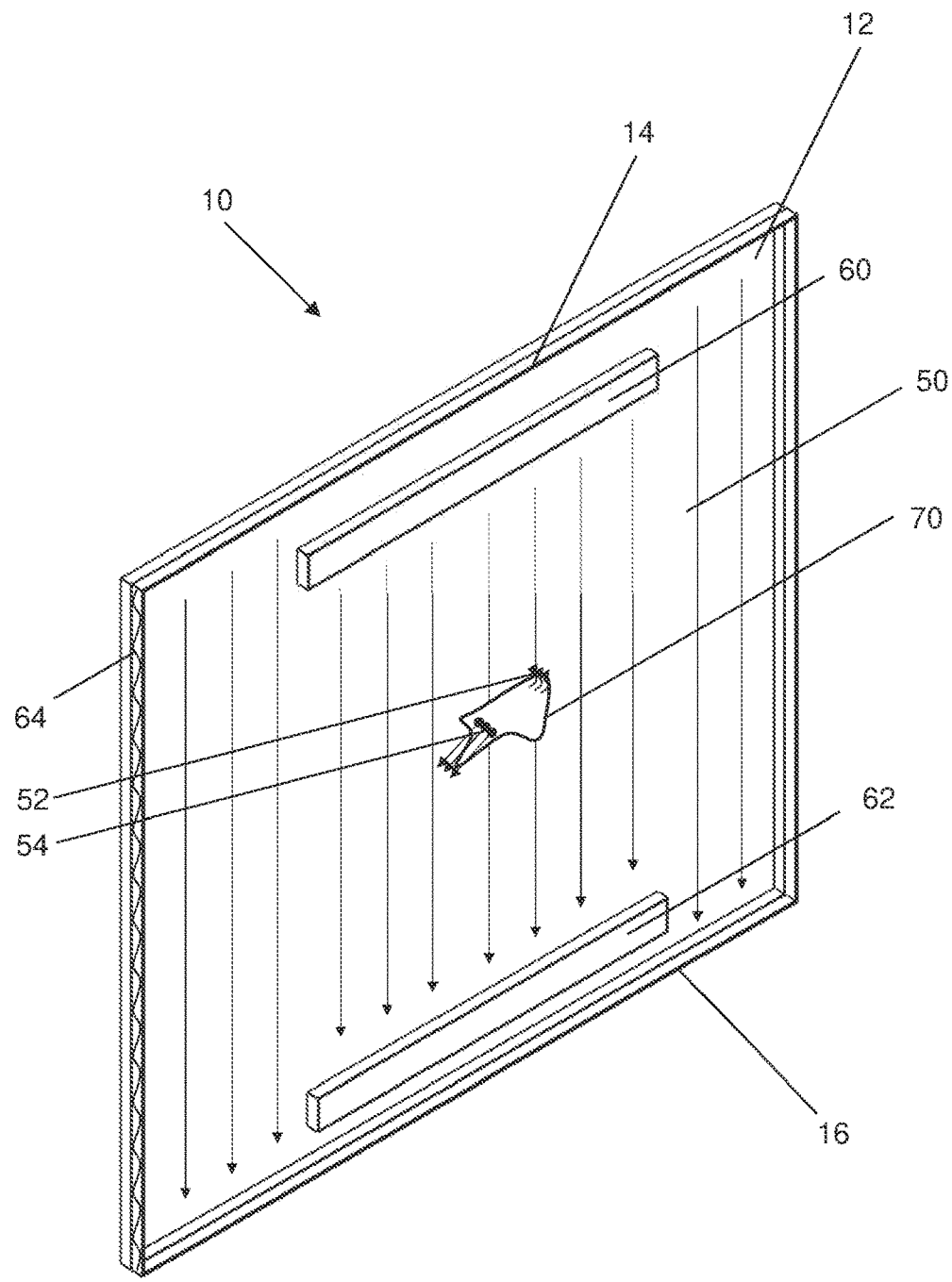
FIG. 2: a schematic representation of a cleaning process on the transparent element.

FIG. 2 shows the transparent element 10 with two ultrasonic transducers 60, 62 mounted on an outer surface 12 of the transparent element 10. The transparent element 10 may be formed as a multilayer element, such as a laminated glass pane. The ultrasonic transducers 60, 62 are in contact with the layer of the transparent element 10 to be cleaned. The ultrasonic transducers 60, 62 couple ultrasonic waves 64 into the transparent element. Thus, the ultrasonic transducers may be disposed on the side of the transparent element 10 to be cleaned. In the case of a single-layer transparent element 10, it is also possible for the ultrasonic transducers 60, 62 to be arranged rearwardly of the side on which the ultrasonic wave 64 is to propagate, preferably as a surface wave. For a multilayer transparent element 10, it is therefore also possible for the ultrasonic transducers 60, 62 to be arranged between two layers of the transparent element 10 and to couple the ultrasonic wave 64 preferably directly into the layer on which the ultrasonic wave 64 is to propagate as a surface wave. The ultrasonic transducers 60, 62 are suitable for transmitting and for receiving ultrasonic waves 64. By receiving an ultrasonic signal emitted by an ultrasonic transducer 60, 62 and analyzing this received ultrasonic signal, it can be determined whether a contaminant 70 is present on the transparent element 10. In this way, the cleaning process can be activated only when a contaminant 70 is actually present on the transparent element 10.

A closed film 50 of the liquid is formed on the transparent element 10 by the outlets 32 described in FIG. 1. A contamination 70 to be loosened or removed in a central region of the transparent element 10 is shown schematically in FIG. 2. However, the contamination 70 may be located anywhere on the outer surface 12 of the transparent element 10. The closed film 50 of the liquid surrounds the contamination 70 on all sides and, in one embodiment, may flow over the contamination 70.

Ultrasonic waves 64 emitted by the ultrasonic transducers 60, 62 are also coupled into the closed film 50 of liquid by the transparent element 10 and/or by the transducers 60, 62. As a result, both the transparent element 10 and the closed film 50 of the liquid vibrate.

These vibrations cause the contamination 70 to be dislodged from the transparent element 10. The loosening of the contamination 70 can be enhanced by increasing the energy input via the ultrasonic waves 64. This results in partial evaporation 52 of the liquid and/or evaporation of the contamination 70 itself. Further increasing the energy input may result in cavitation 54 in the liquid and/or the contamination 70, further aiding the detachment of the contamination 70 from the transparent element.

It may also be provided that, in addition to increasing the energy input, the flow of the liquid on the transparent element 10 is increased. This improves the removal of dissolved or at least partially dissolved impurities 70.

Similarly, it may be provided that a gas, such as air, is blown out of the outlets 32 intermittently with the liquid. This may further aid in the detachment and/or removal of the contaminant 70 or effectively remove residual liquid from the transparent element 10.

LIST OF REFERENCE SIGNS

10 transparent element
12 outer surface
14 first side
16 second side
30 inlet conduit
32 outlet
40 discharge conduit
42 inlet
50 closed film
52 Evaporation
54 Cavitation
60, 62 ultrasonic transducer
64 ultrasonic wave
70 contamination
100 optical monitoring device
110 enclosure
120 recess
130 edge region

The invention claimed is:

1. A method of keeping a viewing area through a transparent element of an optical monitoring device clear of contaminations, comprising the steps of:
   forming a closed film of a liquid on the transparent element;
   coupling ultrasonic waves into at least one of the transparent element and the closed film of the liquid; and
   spontaneously increasing flow rate of the liquid, thereby improving removal of the contaminations from the transparent element,
   wherein the ultrasonic waves coupled into at least one of the transparent element and the closed film of the liquid promote at least one of a loosening of the contaminations and a dissolving of the contaminations,
   wherein the closed film is a flowing top layer formed by flowing the liquid from a first side of the transparent element to a second side of the transparent element, and
   wherein the transparent element comprises multiple layers including an outer layer on which the contaminations are present, and the ultrasonic waves are formed as surface waves that propagate through the transparent element only in the outer layer.

2. The method according to claim 1, wherein the liquid is moved by the ultrasonic waves.

3. The method according to claim 1, wherein the liquid is at least partially vaporized by the ultrasonic waves.

4. The method according to claim 1, wherein the contaminations are transported out of the viewing area by the liquid.

5. The method according to claim 1, wherein coupling the ultrasonic waves into at least one of the transparent element and the closed film of the liquid comprises operating at least one ultrasonic transducer.

6. The method according to claim 1, further comprising:
   operating at least two ultrasonic transducers; and
   forming least one standing wave between the at least two ultrasonic transducers.

7. The method according to claim 1, wherein the liquid is supplied from an edge region at the first side of the transparent element.

8. The method according to claim 1, wherein the liquid comprises at least one of a cleaning agent and a disinfectant.

9. The method according to claim 1, further comprising intermittently adding at least one of a cleaning agent, a disinfectant, and a gas to the liquid.

10. The method according to claim 1, wherein the flowing top layer has a constant thickness.

11. The method according to claim 1, wherein forming the closed film of the liquid on the transparent element comprises supplying the liquid through one or more outlets at the first side of the transparent element.

12. The method according to claim 1, further comprising responsive to detecting a contamination, wetting the transparent element with the closed film of the liquid.

13. The method according to claim 4, wherein the contaminations are transported out of the viewing area by a steady flow of the liquid.

14. The method according to claim 1, wherein the liquid is discharged into one or more inlets at the second side of the transparent element.

15. The method according to claim 1, wherein the liquid is supplied in a circuit, and wherein a treatment of the liquid is carried out in the circuit.

16. The method according to claim 1, wherein the flowing top layer is at least one of laminar and continuous.

17. The method according to claim 1, wherein the ultrasonic waves are intermittently coupled into the transparent element.

* * * * *